2,928,752

PARAFFIN EMULSIONS FOR PROTECTION OF MASONRY SURFACES DURING SETTING

Günter Felletschin, Dusseldorf, Germany, assignor to Dehydag, Deutsche Hydrierwerke G.m.b.H., a corporation of Germany No Drawing. Application September 10, 1957
Serial No. 683,004

Claims priority, application Germany
September 15, 1956

2 Claims. (Cl. 106—268)

This invention relates to paraffin emulsions, and more particularly to aqueous paraffin emulsions adapted for use as protective coatings on masonry surfaces during the setting period.

I have found that paraffin emulsions, and more precisely aqueous paraffin emulsions comprising high-molecular amines with lipophilic radicals in the molecule or their derivatives, are useful as protective coatings on masonry surfaces, such as mortar, cement, concrete, etc., during the setting period. When such paraffin emulsions are applied to a wet, freshly poured masonry surface of the above-mentioned type, they form a thin film which protects the masonry against atmospheric influences, such as rain, sun, etc. Under the protection of the thin paraffin layer the masonry cannot absorb or lose any substantial quantities of moisture, and therefore sets uniformly without the formation of fissures or cracks. Consequently, it is no longer necessary, for example, in highway construction, to protect the freshly poured concrete roadway from excessively rapid dehydration by covering it with straw or sprinkling sand thereon. Instead, it is sufficient to merely coat the freshly poured concrete with a layer of the paraffin emulsion disclosed herein. The paraffin emulsions in accordance with the present invention may be employed in conjunction with the construction of mortar, cement and concrete structures, plaster coats, as well as shaped objects from such structural materials. The paraffin emulsions of the present invention adhere firmly to the masonry surface, distribute themselves evenly thereon and are very economical.

The above-enumerated effects are achieved by emulsifying the paraffin with the aid of emulsifiers which have been produced from high-molecular amines containing lipophilic radicals or their derivatives. In addition to possessing a good emulsifying action, which substantially promotes the formation of a thin, homogeneous surface coating on the structural materials, amines of this type exhibit a specific adhesive affinity toward the mineral components of the structural materials.

For this purpose the paraffin emulsions are produced either with amine-containing emulsifiers, or materials which impart cationic properties to the emulsions are incorporated therein. Known compounds of this type are, for example, water-soluble onium compounds, especially quaternary nitrogen or phosphorus compounds. Water-soluble salts of high-molecular primary, secondary or tertiary amines have a similar effect.

All of these compounds are well known or may be obtained in accordance with known methods. A few specific, representative examples of such compounds are the following: alkyl-dimethyl-cyclohexyl ammonium chloride wherein the alkyl radicals have from 12 to 18 carbon atoms in the alkyl chain, alkyl-pyridinium chlorides with alkyl chains having 12 to 18 carbon atoms, alkyl-phosphonium chlorides, and salts of high-molecular monoalkyl-, dialkyl- or trialkyl-amines formed with inorganic or low-molecular organic acids, etc. The alkyl radicals in each of these compounds may also be replaced by other lipophilic radicals. Moreover, these lipophilic radicals may comprise substituents and may be interrupted by heteroatoms, i.e., oxygen, nitrogen or sulfur atoms, or by heteroatom groups.

In addition to these emulsifiers, the paraffin emulsions may also comprise acid salts of trivalent or higher polyvalent metals, such as acid aluminum salts, which also possess water-repellent properties, or cationic colloids of the methyl cellulose type.

For the production of the emulsions it has also been found to be advantageous to employ amine-containing, wax-like substances as additives. Examples of such compounds are salts of high-molecular primary, secondary or tertiary amines formed with saturated or unsaturated high-molecular carboxylic acids, especially fatty acids, such as capric acid, lauric acid, myristic acid, palmitic acid, stearic acid, oleic acid or mixtures thereof of natural or synthetic origin. Similarly suitable are salts of onium compounds, especially quaternary nitrogen compounds, and amionic compounds, such as salts of alkylsulfonates, alkylsulfates or alkyl-benzene sulfonates.

Paraffins or paraffin-like substances which may be used in the production of the emulsions according to the present invention include customary technical-grade paraffin, and high-boiling-point mineral oils for example, lubricating or residual oils, modified if desired by the addition of bituminous materials, tar residues and tar oils. Moreover, oils, fats or waxes of animal, vegetable or synthetic origin or high-molecular fatty alcohols and mixtures of these substances may be added to the emulsions according to the present invention.

In addition to the above-mentioned amine-containing emulsifiers, electroneutral emulsifiers, such as the well-known addition reaction products of ethylene oxide with high molecular organic compounds having exchangeable hydrogen atoms linked to the remainder of the molecule through oxygen, sulfur or nitrogen may be used. Examples of such compounds are the addition reaction products of 5–50 mols ethylene oxide per mole of high-molecular fatty alcohols, fatty amines, fatty acids, carboxylic acid amides, mercaptans and the like.

The quantitative proportions of the cationic emulsifiers which are added to the aqueous paraffin emulsions according to the invention are variable and are primarily predicated upon the over-all composition of the emulsions. In general, the aqueous emulsion should contain from 2 to 20% by weight, particularly from 5 to 10%, of the amine-containing material and from 2 to 50% by weight, particularly from 5 to 20%, of the paraffin component.

The following examples will further illustrate the present invention and enable others skilled in the art to understand the invention more completely, without, however, limiting the invention thereto.

Example I 80 parts by weight hard paraffin were fused together with 20 parts by weight of an emulsifier composed of 50 parts by weight of the addition reaction product formed by 10 mols ethylene oxide and oleyl alcohol, 30 parts by weight of the oleic acid amine salt having a chain length of 12 to 18 carbon atoms in the amine radial, and 20 parts by weight of a fatty alcohol mixture having from 16 to 20 carbon atoms in the fatty radical. The resulting fused mixture was then emulsified in 1½ times its volume of water. A stable aqueous emulsion was obtained. This emulsion was diluted with water in a ratio of 1:10 and was thereafter applied to the freshly poured concrete surface, either by painting, sprinkling or spraying it thereon. The concrete set satisfactorily even while being exposed to direct sunlight and did not need to be covered with straw or sand.

Example II 20 parts by weight paraffin were fused together with 10 parts by weight mineral oil and 6 parts by weight of an emulsifier mixture composed of 18% by weight of a fatty alcohol mixture having 16 to 18 carbon atoms, 54% by weight of the addition reaction product formed by 10 mols ethylene oxide with 1 mol technical grade oleyl alcohol and 28% by weight of the oleic acid amine salt having a chain length of 16 to 18 carbon atoms in the amine radical. The resulting fused mixture was then emulsified in 64 parts by weight of an aqueous solution of aluminum triformate having a concentration of 24 gm. per liter, calculated as $Al_2O_3$. The resulting aqueous emulsion was applied to a freshly poured concrete surface as described in the preceding example. The same favorable results were obtained.

Substantially equal results were obtained when the above paraffin emulsions were applied to fresh mortar, cement and plaster surfaces.

While I have illustrated the present invention with the aid of certain specific embodiments thereof, it will be apparent to those skilled in the art that the invention is not limited to those embodiments, and that various changes and modificaions may be made without departing from the spirit of the invention or the scope of the appended claims.

I claim:
1. An aqueous emulsion adapted for use as a protective coating on masonry surfaces during the setting period consisting essentially of water, 2-50 weight percent paraffin, about 10 weight percent of an addition product of 5-50 mols of ethylene oxide and 1 mol oleyl alcohol, 2-20 weight percent of an oleic acid amine salt having a chain length of 12 to 18 carbon atoms in the amine radical, about 4 weight percent of at least one fatty alcohol having 16 to 20 carbon atoms, and from 0-10 weight percent mineral oil.

2. A composition intended for use in aqueous emulsion as a coating on masonry surfaces during the setting period, consisting essentially of a mixture of the following non-aqueous components; about 80 parts paraffin; about 20 parts of an emulsifier consisting of about 50 parts of an addition product of 5-50 mols of ethylene oxide and 1 mol oleyl alcohol, about 30 parts of an oleic acid amine salt having a chain length of 12 to 18 carbon atoms in the amine radical, and about 20 parts of at least one fatty alcohol having 16 to 20 carbon atoms; and from 0-40 parts mineral oil.

References Cited in the file of this patent

UNITED STATES PATENTS

| | | |
|---|---|---|
| 2,057,413 | Bridgeman et al. | Oct. 13, 1936 |
| 2,206,090 | Haggemmacher | July 2, 1940 |
| 2,298,147 | Thompson | Oct. 6, 1942 |
| 2,274,509 | Muller | Feb. 24, 1942 |
| 2,350,800 | Miller | June 6, 1944 |
| 2,395,025 | Wassell | Feb. 19, 1946 |
| 2,759,849 | Kafig | Aug. 21, 1956 |
| 2,782,124 | Rosenberg et al. | Feb. 19, 1957 |